Patented Nov. 27, 1934

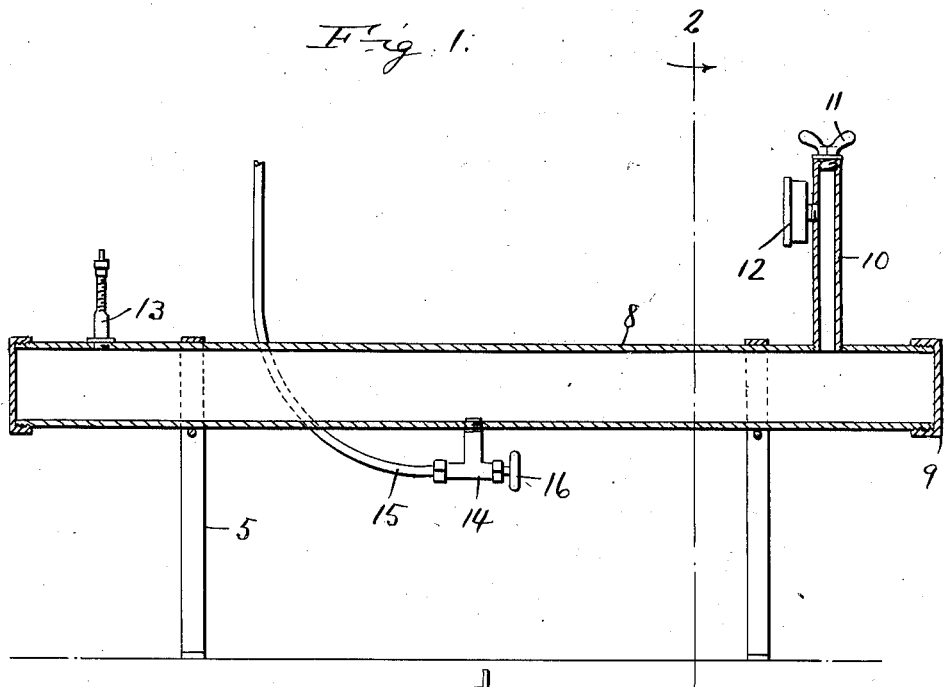
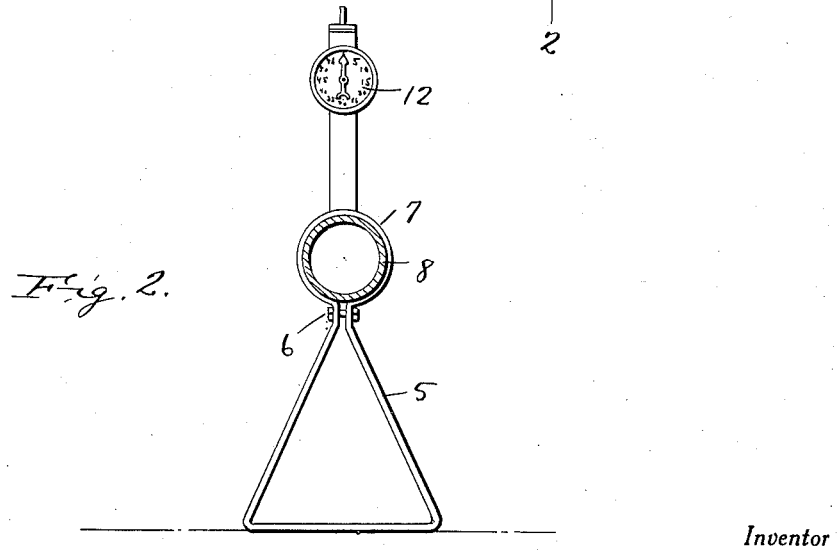

1,982,408

UNITED STATES PATENT OFFICE 1,982,408

TESTER FOR OIL LINES

Frank W. Wotachek, Kewaunee, Wis., assignor of two-thirds to Lakeside Garage and Implement Company, Kewaunee, Wis.

Application December 7, 1929, Serial No. 412,421
Renewed October 18, 1933

1 Claim. (Cl. 73—51)

The present invention relates to testers for the oil feed lines of automobile or tractor engines or the like and has for its principal object to provide a device of this character including air pressure means for forcing oil into the oil feed pipe of the engine bearing together with an indicator to show the amount of pressure required to force the oil through the oil pipe and thus determine whether or not the pipe is clogged.

A further object is to provide a device of this character of a simple and practical construction, which is portable so as to enable its free movement into position for conveniently attaching to the oil feed pipe of the engine, which furthermore is simple and practical in construction, relatively inexpensive to manufacture and otherwise well adapted for the purposes for which the same is intended.

Other objects and advantages reside in the special construction, combination and arrangement of the various elements forming the invention as more fully hereinafter described and claimed, reference being had to the accompanying drawing forming part hereof, wherein like numerals refer to like parts throughout, and in which:

Figure 1 is a longitudinal sectional view through the oil reservoir forming part of the invention and Figure 2 is a vertical sectional view taken along a line 2—2 of Figure 1.

Referring to the drawing in detail wherein for the purpose of illustration I have disclosed a preferred embodiment of the invention, the numeral 5 designates a pair of standards constructed of continuous pieces of strap iron and having opposite portions bent inwardly and secured together by bolts 6 whereby to provide a clamp 7 at one end of the standard for securing a cylindrical reservoir 8 in a horizontal elevated position.

The reservoir 8 may be formed from a section of pipe and having its ends closed by threaded caps 9. To the upper side of the reservoir is attached an oil tap 10 having a filler plug 11 threaded in its upper end and provided with a pressure indicator 12 having free communication with the interior of the reservoir to indicate the pressure of air contained therein.

The upper portion of the reservoir 8 is also provided with an air valve 13 of a type generally provided for inflating pneumatic automobile tires and by means of which air under pressure may be forced into the cylinder through the valve 13 and which pressure will be indicated on the pressure indicating instrument 12.

A tap 14 is also threaded through the wall of the reservoir, at the bottom portion thereof and to which tap an oil pipe 15 is connected for attaching to the oil pipe of an engine. The tap 14 is provided with a valve 16 for controlling communication therethrough.

The reservoir 8 is partly filled with lubricating oil and the pipe 15 attached to the oil feed pipe of the engine whereupon an air hose is attached to the valve 13 for forcing air under pressure into the reservoir.

The oil will be forced through the pipe 15 to the engine and it will be apparent that should an excessive pressure be required to force oil through the bearing of the engine, the accumulated pressure in the reservoir will show upon the indicator 12 and thus serve to show whether or not any obstruction is present in the oil feed pipe of the engine.

It is obvious that my invention is susceptible to various changes and modifications in construction without departing from the spirit of the invention or the scope of the appended claim, and I accordingly claim all such forms of the device to which I am entitled.

Having thus described my invention, what I claim as new is:

A tester for indicating the presence of an obstruction in an oil feed system of the type described, comprising a fluid conduit adapted to be connected to a section of the oil feed system, a pressure reservoir with which said conduit is connected and having a valve for admitting fluid pressure thereto, an oil intake pipe, and a pressure gauge carried on the oil intake pipe for indicating the resistance offered by any obstruction in the section of said oil feed system, said reservoir being in the form of a horizontal elongated cylinder having brackets clamped thereto for supporting the cylinder above a supporting surface, each bracket comprising a continuous band in the shape of a triangle having at its apex a ring-like portion formed as a continuation of the sides of the triangle and adapted to conformably embrace the sides of the cylinder, and a bolt passed through the separated ends of the sides of the triangle below said ring-like portion for drawing the ring closely about the sides of the cylinder.

FRANK W. WOTACHEK.